United States Patent
Anglin et al.

(10) Patent No.: US 10,311,330 B2
(45) Date of Patent: Jun. 4, 2019

(54) PROACTIVE INPUT SELECTION FOR IMPROVED IMAGE ANALYSIS AND/OR PROCESSING WORKFLOWS

(71) Applicant: International Business Machines Corporation, Armonk, NY (US)

(72) Inventors: Debbie A. Anglin, Leander, TX (US); Jeffrey A. Calcaterra, Chapel Hill, NC (US); Su Liu, Austin, TX (US); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/239,716

(22) Filed: Aug. 17, 2016

(65) Prior Publication Data
US 2018/0053068 A1 Feb. 22, 2018

(51) Int. Cl.
*G06K 9/46* (2006.01)
*G06K 9/66* (2006.01)

(52) U.S. Cl.
CPC ................................. *G06K 9/4671* (2013.01)

(58) Field of Classification Search
None
See application file for complete search history.

(56) References Cited

U.S. PATENT DOCUMENTS 6,047,251 A 4/2000 Pon et al.
6,584,221 B1 * 6/2003 Moghaddam ..... G06F 17/30256
382/165

(Continued)

FOREIGN PATENT DOCUMENTS

CN 105389375 A 3/2016
EP 2144189 A2 1/2010
(Continued)

OTHER PUBLICATIONS

Restriction Requirement from U.S. Appl. No. 15/239,694, dated Aug. 18, 2017.
(Continued)

*Primary Examiner* — Feng Niu
(74) *Attorney, Agent, or Firm* — Zilka-Kotab, P.C.

(57) ABSTRACT

Systems, methods, and computer program products for proactively improving image analysis and/or processing in real time are presented, in accordance with various embodiments. In one embodiment, a computer-implemented method includes: receiving an analysis and/or processing request from a mobile device; and either generating or retrieving analysis and/or processing information based on a result of either or both of: determining whether the analysis and/or processing request includes image data suitable for generating an analysis and/or processing result; and determining whether the analysis and/or processing request includes metadata suitable for generating an estimated analysis and/or processing result. In another embodiment, a computer-implemented method includes: capturing image data; evaluating one or more conditions corresponding to the captured image data; generating metadata corresponding to the captured image data; and generating and submitting the analysis and/or processing request to an analysis and/or processing platform. Corresponding systems and computer program products are also described.

21 Claims, 5 Drawing Sheets

(56) References Cited

U.S. PATENT DOCUMENTS

| | | | |
|---|---|---|---|
| 6,763,148 B1* | 7/2004 | Sternberg | G06F 17/30247 382/293 |
| 6,834,274 B2* | 12/2004 | Tafoya | G06N 5/025 706/50 |
| 7,359,562 B2* | 4/2008 | Raskar | H04N 1/3871 382/254 |
| 7,474,759 B2* | 1/2009 | Sternberg | G06F 17/30247 382/100 |
| 7,499,588 B2 | 3/2009 | Jacobs et al. | |
| 7,590,310 B2* | 9/2009 | Retterath | G06K 9/3233 382/190 |
| 7,751,805 B2* | 7/2010 | Neven | G06K 9/228 455/3.01 |
| 7,756,291 B2* | 7/2010 | Lennington | G06F 17/30247 358/3.28 |
| 7,912,289 B2 | 3/2011 | Kansal et al. | |
| 7,933,454 B2* | 4/2011 | Bressan | G06K 9/00456 382/224 |
| 8,009,921 B2* | 8/2011 | Csurka | G06K 9/00664 382/228 |
| 8,019,118 B2* | 9/2011 | Sternberg | G06F 17/30247 382/100 |
| 8,150,910 B2* | 4/2012 | Tatsubori | G06Q 30/0251 705/14.49 |
| 8,300,764 B2* | 10/2012 | Yamaguchi | G06T 7/73 378/62 |
| 8,520,099 B2* | 8/2013 | Hayashi | H04N 9/045 348/239 |
| 8,601,147 B2* | 12/2013 | Craft | H04L 67/06 709/231 |
| 8,725,490 B2* | 5/2014 | Athsani | G06F 17/289 703/3 |
| 8,942,437 B2* | 1/2015 | Schneider | G06K 9/0002 382/115 |
| 8,949,170 B2 | 2/2015 | Zadeh | |
| 9,082,035 B2 | 7/2015 | Hwang et al. | |
| 9,141,184 B2* | 9/2015 | Uchikoshi | G06F 3/005 |
| 9,171,261 B1 | 10/2015 | Zadeh | |
| 9,177,225 B1* | 11/2015 | Cordova-Diba | G06T 5/00 |
| 9,342,533 B2* | 5/2016 | Copsey | G06F 17/30253 |
| 9,563,690 B2* | 2/2017 | Copsey | G06F 17/30253 |
| 9,639,921 B2* | 5/2017 | Cho | G06K 9/4661 |
| 9,697,348 B1* | 7/2017 | Maresh | G06F 21/36 |
| 2001/0032070 A1 | 10/2001 | Teicher | |
| 2002/0156832 A1* | 10/2002 | Duri | G06F 17/30864 709/203 |
| 2003/0093412 A1* | 5/2003 | Urkumyan | G06F 17/30592 |
| 2003/0123737 A1* | 7/2003 | Mojsilovic | G06F 17/30247 382/224 |
| 2003/0130974 A1* | 7/2003 | Tafoya | G06N 5/025 706/50 |
| 2003/0164819 A1 | 9/2003 | Waibel | |
| 2004/0133927 A1* | 7/2004 | Sternberg | G06F 17/30247 725/136 |
| 2004/0150726 A1* | 8/2004 | Gallagher | G06T 5/00 348/222.1 |
| 2006/0041590 A1 | 2/2006 | King et al. | |
| 2007/0098288 A1* | 5/2007 | Raskar | H04N 1/3871 382/254 |
| 2008/0199060 A1* | 8/2008 | Boyden | G06T 5/006 382/131 |
| 2008/0221862 A1* | 9/2008 | Guo | G06F 17/289 704/2 |
| 2008/0233980 A1 | 9/2008 | Englund et al. | |
| 2009/0048820 A1 | 2/2009 | Buccella | |
| 2009/0106016 A1 | 4/2009 | Athsani et al. | |
| 2009/0164213 A1* | 6/2009 | Lennington | G06F 17/30247 704/231 |
| 2009/0196510 A1 | 8/2009 | Gokturk et al. | |
| 2010/0008582 A1 | 1/2010 | Kim et al. | |
| 2010/0011105 A1* | 1/2010 | Tatsubori | G06Q 30/02 709/226 |
| 2010/0067773 A1* | 3/2010 | Yamaguchi | G06T 7/73 382/132 |
| 2010/0077003 A1 | 3/2010 | Kondo et al. | |
| 2010/0228751 A1* | 9/2010 | Oh | G06F 17/30265 707/756 |
| 2010/0278439 A1* | 11/2010 | Lennington | G06F 17/30247 382/209 |
| 2011/0279664 A1* | 11/2011 | Schneider | G06K 9/0002 348/77 |
| 2011/0279712 A1* | 11/2011 | Hayashi | H04N 9/045 348/239 |
| 2012/0095982 A1* | 4/2012 | Lennington | G06F 17/30247 707/706 |
| 2012/0130704 A1* | 5/2012 | Lee | G06F 17/289 704/3 |
| 2012/0163668 A1 | 6/2012 | Englund et al. | |
| 2012/0268621 A1* | 10/2012 | Kanma | G01C 17/28 348/222.1 |
| 2013/0108115 A1 | 5/2013 | Hwang et al. | |
| 2013/0110565 A1 | 5/2013 | Means, Jr. et al. | |
| 2013/0114849 A1* | 5/2013 | Pengelly | G06F 17/289 382/103 |
| 2013/0230214 A1* | 9/2013 | Arth | G06T 7/74 382/107 |
| 2014/0067679 A1* | 3/2014 | O'Reilly | G06F 21/32 705/44 |
| 2014/0081619 A1 | 3/2014 | Solntseva et al. | |
| 2014/0160250 A1* | 6/2014 | Pomerantz | H04N 5/23229 348/47 |
| 2014/0280091 A1 | 9/2014 | Nasarov et al. | |
| 2014/0297256 A1 | 10/2014 | Rogowski et al. | |
| 2014/0344948 A1* | 11/2014 | Hayato | G06F 21/6218 726/26 |
| 2015/0049948 A1 | 2/2015 | Bala | |
| 2015/0093033 A1 | 4/2015 | Kwon et al. | |
| 2015/0268913 A1* | 9/2015 | Adachi | G06F 3/1211 358/1.15 |
| 2015/0286888 A1 | 10/2015 | Maison | |
| 2015/0370785 A1* | 12/2015 | Mauser | G06F 17/289 704/7 |
| 2016/0004692 A1 | 1/2016 | Rogowski et al. | |
| 2016/0165193 A1* | 6/2016 | Rasheed | G06K 9/3241 348/143 |
| 2016/0189000 A1* | 6/2016 | Dube | G06F 17/30247 382/160 |
| 2016/0292887 A1* | 10/2016 | Cho | G06K 9/4661 |
| 2016/0350286 A1 | 12/2016 | Murthy et al. | |
| 2016/0371256 A1* | 12/2016 | Mauser | G06F 17/289 |
| 2017/0046427 A1* | 2/2017 | Tang | G06F 17/30731 |
| 2018/0052832 A1 | 2/2018 | Anglin et al. | |

FOREIGN PATENT DOCUMENTS

| | | |
|---|---|---|
| EP | 2410465 A1 | 1/2012 |
| JP | 5267451 B2 | 8/2013 |
| WO | 2009115855 A1 | 9/2009 |
| WO | 2011080946 A1 | 7/2011 |

OTHER PUBLICATIONS

International Search Report and Written Opinion from PCT Application No. PCT/IB2017/053734, dated Sep. 27, 2017.

Chang et al., "Enhancing Image-Based Arabic Document Translation Using a Noisy Channel Correction Model," Proceedings of MT Summit XI, 2007, pp. 1-7.

Anglin et al., U.S. Appl. No. 15/239,694, filed Aug. 17, 2016.

List of IBM Patents or Patent Applications Treated As Related.

Non-Final Office Action from U.S. Appl. No. 15/239,694, dated Dec. 29, 2017.

Final Office Action from U.S. Appl. No. 15/239,694, dated Jun. 25, 2018.

* cited by examiner

PROACTIVE INPUT SELECTION FOR IMPROVED IMAGE ANALYSIS AND/OR PROCESSING WORKFLOWS

BACKGROUND

The presently disclosed inventive concepts relate to image analysis, and more specifically to improving workflows that rely on image data as a source of input via adaptively and proactively replacing and/or supplementing inputs for analysis in the course of the workflow.

A plethora of online tools and workflows exist which leverage image data as a source of information for various applications. As mobile devices become an increasingly prevalent mechanism to access online tools, capturing image data and performing such analyses via mobile devices is a useful extension of such workflow solutions.

In addition, as optical sensors embedded with mobile devices become more powerful, a wide variety of image-based technologies are migrating to mobile platforms. Accordingly, some tools for mobile applications include the ability to extract textual information from image data, so long as the textual information depicted in the image data is of sufficient quality to allow conventional extraction techniques, such as optical character recognition (OCR), to accurately recognize the characters of the text.

However, due to limitations inherent to the mobile device, and also the variability of conditions surrounding capturing an image using a mobile device, it is often difficult, or even impossible, to capture an image of sufficient quality to allow conventional extraction techniques to accurately recognize the characters of the text or otherwise complete image processing requisite to advance or complete the workflow. As a result, existing image analysis tools are unable to provide an accurate result in many situations.

Accordingly, it would be beneficial to provide systems and techniques for providing accurate image analysis results even when the image data are of insufficient quality to allow conventional techniques to accurately analyze the image data.

SUMMARY

In one embodiment, a computer-implemented method is configured for proactively improving image analysis and/or processing in real time by processing an analysis and/or processing request. The method includes: receiving the analysis and/or processing request from a mobile device; and either generating or retrieving analysis and/or processing information based on a result of either or both of: determining whether the analysis and/or processing request includes image data suitable for generating an analysis and/or processing result; and determining whether the analysis and/or processing request includes metadata suitable for generating an estimated analysis and/or processing result.

In another embodiment, a computer program product for proactively improving image analysis and/or processing in real time includes: a computer readable storage medium having stored thereon first program instructions executable by a processor. The first program instructions are configured to cause the processor, upon execution thereof, to generate or retrieve analysis and/or processing information based on a result of either or both of: determining, using the processor, whether an analysis and/or processing request includes image data suitable for generating an analysis and/or processing result; and determining, using the processor, whether the analysis and/or processing request includes metadata suitable for generating an estimated analysis and/or processing result.

In yet another embodiment, a system configured to proactively improve image analysis and/or processing in real time by processing an analysis and/or processing request includes a processor and logic integrated with, executable by, or integrated with and executable by the processor. The logic is configured to: receive the analysis and/or processing request from a mobile device; and either generate or retrieve analysis and/or processing information based on a result of either or both of: determining whether the analysis and/or processing request includes image data suitable for generating an analysis and/or processing result; and determining whether the analysis and/or processing request includes metadata suitable for generating an estimated analysis and/or processing result.

In still yet another embodiment, a computer-implemented method is configured for proactively improving image analysis and/or processing in real time by generating and submitting an analysis and/or processing request. The method includes: capturing image data; evaluating one or more conditions corresponding to the captured image data; generating metadata corresponding to the captured image data; and generating and submitting the analysis and/or processing request to an analysis and/or processing platform.

In a further embodiment, a computer program product for proactively improving image analysis and/or processing in real time by generating and submitting an analysis and/or processing request includes a computer readable storage medium having stored thereon: first program instructions executable by a processor to cause the processor to evaluate one or more conditions corresponding to captured image data; second program instructions executable by the processor to cause the processor to generate metadata corresponding to the captured image data; and third program instructions executable by the processor to cause the processor to generate and submit the analysis and/or processing request to an analysis and/or processing platform.

Other aspects and embodiments of the present invention will become apparent from the following detailed description, which, when taken in conjunction with the drawings, illustrate by way of example the principles of the invention.

DETAILED DESCRIPTION

Figure 1:
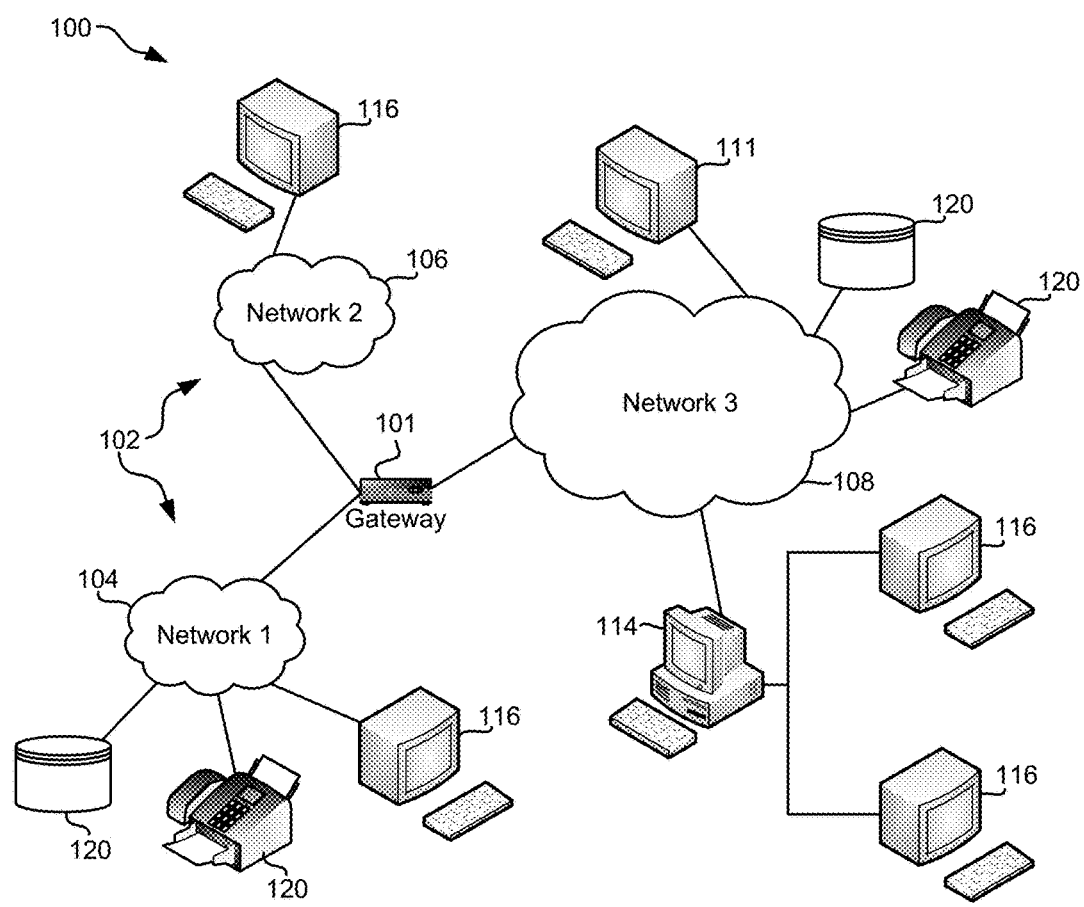
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for improving image analysis and workflows relying on or involving image analysis in real time by intelligently and selectively replacing and/or supplementing image data inputs provided to the workflow. While the descriptions provided below set forth various aspects of the presently disclosed inventive concepts within the context of a workflow for machine translation, upon reading these descriptions persons having ordinary skill in the art will understand that the subject matter of the instant disclosure is equally applicable to any type of workflow involving image analysis, without limitation.

In one general embodiment, a computer-implemented method is configured for proactively improving image analysis and/or processing in real time by processing an analysis and/or processing request. The method includes: receiving the analysis and/or processing request from a mobile device; and either generating or retrieving analysis and/or processing information based on a result of either or both of: determining whether the analysis and/or processing request includes image data suitable for generating an analysis and/or processing result; and determining whether the analysis and/or processing request includes metadata suitable for generating an estimated analysis and/or processing result.

In another general embodiment, a computer program product for proactively improving image analysis and/or processing in real time includes: a computer readable storage medium having stored thereon first program instructions executable by a processor. The first program instructions are configured to cause the processor, upon execution thereof, to generate or retrieve analysis and/or processing information based on a result of either or both of: determining, using the processor, whether an analysis and/or processing request includes image data suitable for generating an analysis and/or processing result; and determining, using the processor, whether the analysis and/or processing request includes metadata suitable for generating an estimated analysis and/or processing result.

In yet another general embodiment, a system configured to proactively improve image analysis and/or processing in real time by processing an analysis and/or processing request includes a processor and logic integrated with, executable by, or integrated with and executable by the processor. The logic is configured to: receive the analysis and/or processing request from a mobile device; and either generate or retrieve analysis and/or processing information based on a result of either or both of: determining whether the analysis and/or processing request includes image data suitable for generating an analysis and/or processing result; and determining whether the analysis and/or processing request includes metadata suitable for generating an estimated analysis and/or processing result.

In still yet another general embodiment, a computer-implemented method is configured for proactively improving image analysis and/or processing in real time by generating and submitting an analysis and/or processing request. The method includes: capturing image data; evaluating one or more conditions corresponding to the captured image data; generating metadata corresponding to the captured image data; and generating and submitting the analysis and/or processing request to an analysis and/or processing platform.

In a further general embodiment, a computer program product for proactively improving image analysis and/or processing in real time by generating and submitting an analysis and/or processing request includes a computer readable storage medium having stored thereon: first program instructions executable by a processor to cause the processor to evaluate one or more conditions corresponding to captured image data; second program instructions executable by the processor to cause the processor to generate metadata corresponding to the captured image data; and third program instructions executable by the processor to cause the processor to generate and submit the analysis and/or processing request to an analysis and/or processing platform.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
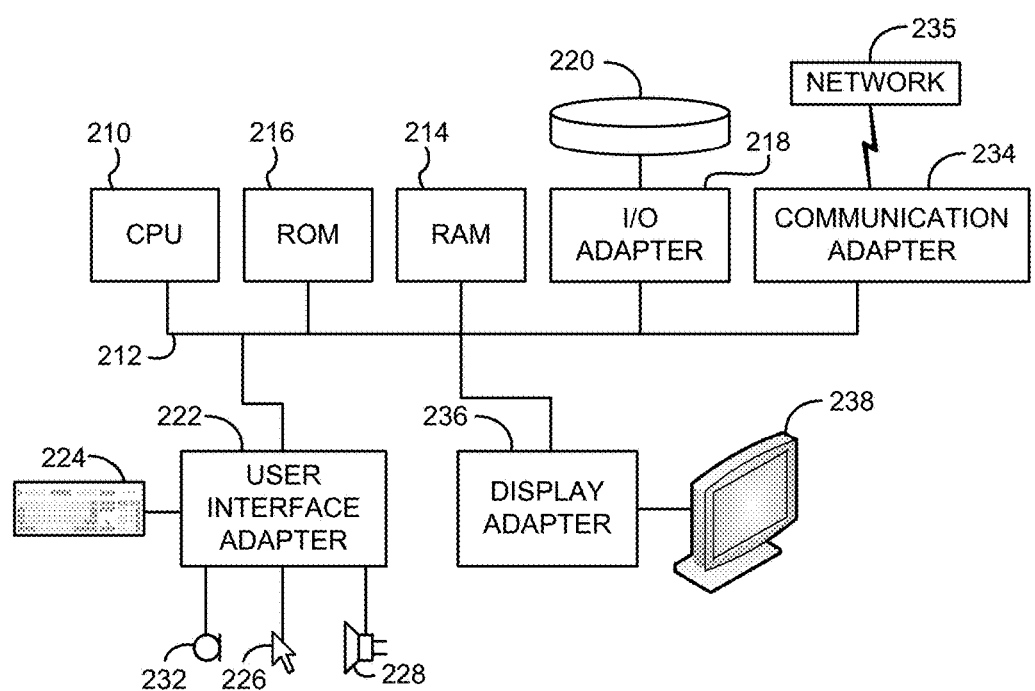
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
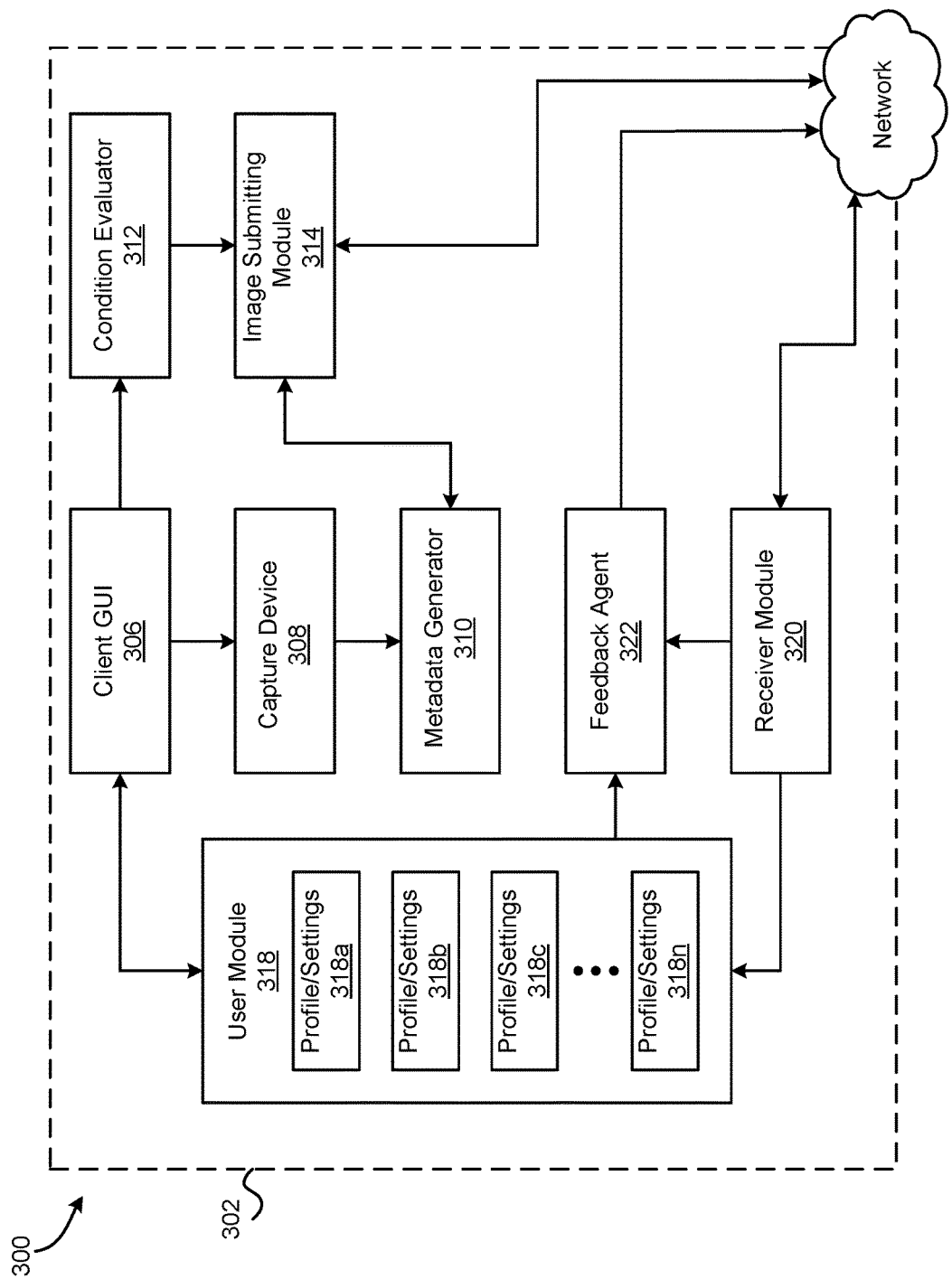
FIG. 3 illustrates an exemplary analysis and/or processing platform, according to one embodiment.
Figure 3:
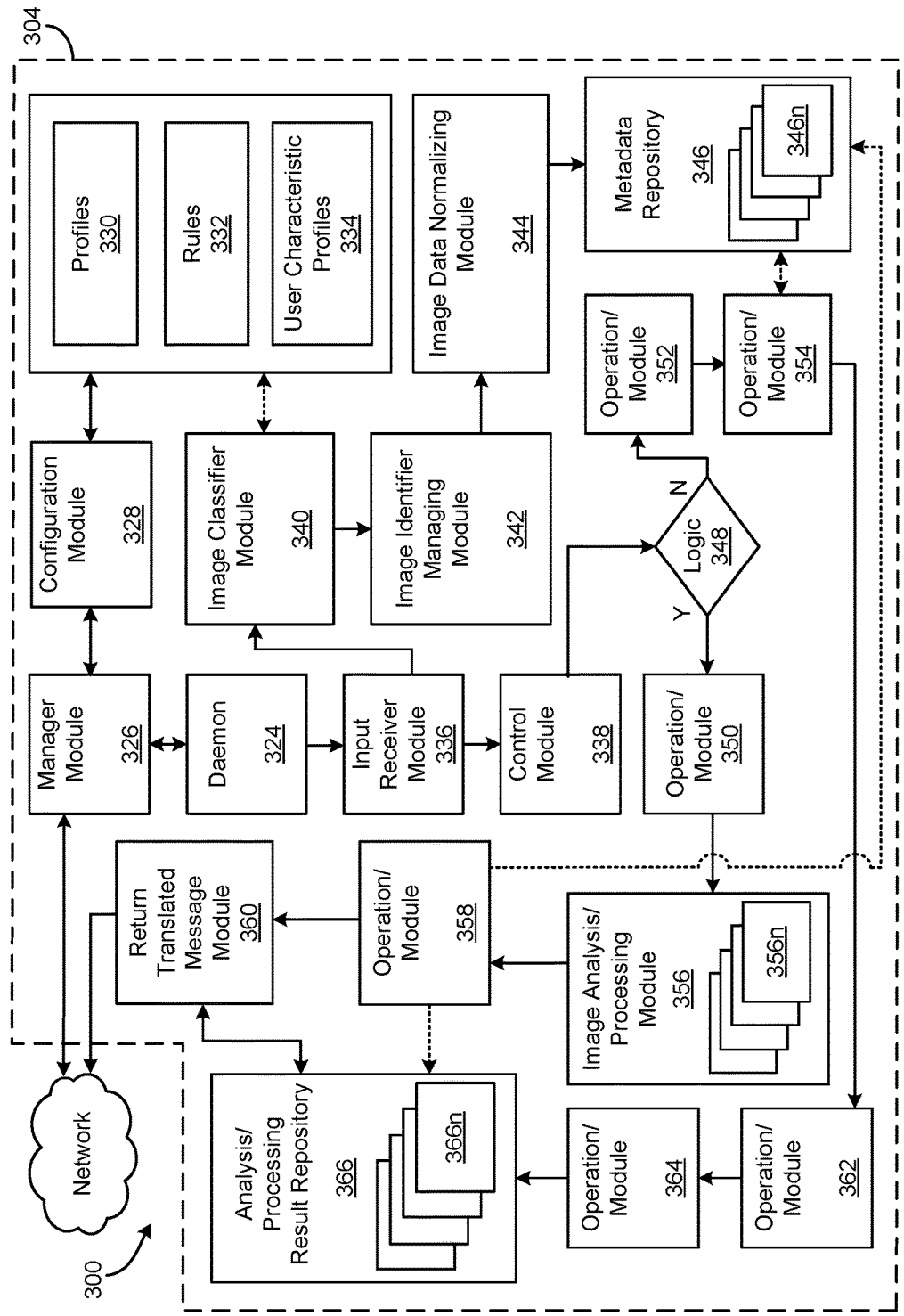

Now referring to FIG. 3, an image processing and/or analysis platform 300 is shown according to one embodiment. Note that some of the elements shown in FIG. 3 may be implemented as hardware and/or software, according to various embodiments. The platform 300 may include a client side 302 and a server side 304, in various approaches. As shown in FIG. 3, the client side 302 may comprise a workstation or a mobile device, preferably a mobile device, while the server side 304 is located remotely from the client side 302 and is in communication with the client-side 302 via a network, e.g. the Internet, a mobile data network, etc. as would be understood by a person having ordinary skill in the art upon reading the present disclosures.

As will be further understood by persons having ordinary skill in the art, conventional image analysis workflows such as machine translation solutions rely on a similar client/server-based architecture require high speed and high bandwidth network connections to facilitate sufficient data transfer and feedback between each side of the architecture. Similarly, low latency in the network is key to providing practical services to users. Further still, security restrictions (e.g. concerning transfer of personal, confidential, or other secure information) represent significant limitations to providing services associated with image analysis workflows.

Moreover, the client/server architecture is common due to the high computational cost and storage requirements associated with performing image analysis, image processing, machine translation and providing associated services to users, especially where the workflow accepts or utilizes image data as an input. Image processing (e.g. to normalize an image orientation, color characteristics, etc. as would be understood by skilled artisans in the field of image processing) is a particularly intensive aspect of such solutions, and requires processing power that may not be available on the client side, particularly where the client device is a mobile device.

So too is extraction of text, e.g. via OCR, a computationally-intensive operation requiring significant processing power.

Translation techniques such as natural language processing (NLP) analysis represent yet another computationally intensive task that may be employed in the translation process. In sum, machine translation techniques of the type described herein are characterized by significant computational costs that often precipitate a need to perform at least some operations of the translation workflow on or within a server environment. Similarly, image processing techniques are known to be computationally expensive.

Accordingly, and as will be appreciated further upon reviewing the additional descriptions below, the presently disclosed inventive techniques represent an improvement to image analysis systems and architectures. Implementing the architecture and techniques described herein enables accurate accomplishment of image analysis while significantly reducing the computational cost of performing such image analysis, particularly from image data inputs.

In brief, and again as described further below, determining whether image data are of sufficient quality to accurately recognize and extract data therefrom, and if not selecting substitute or alternate inputs to accomplish image analysis and/or processing may avoid the need to attempt processing the low-quality image, recognizing text depicted therein, extracting text, etc. when such operations are unlikely or incapable of producing an accurate result. Similarly, even if image data are of sufficient quality to be processed and information extracted therefrom, if a same or similar image has been previously analyzed using the system, the presently disclosed inventive concepts enable provision of accurate analysis results directly without engaging in the computationally-intensive process of processing the image, recognizing the content, extracting the text, etc. according to the particular workflow in question.

The presently disclosed inventive concepts also represent an improvement to the field of image analysis by way of enabling the generation and/or retrieval of image analysis and/or processing information under circumstances that would not allow accurate image analysis using conventional approaches and systems. For instance, when conditions surrounding the process of capturing an image (e.g. weather, illumination, distance, etc.) preclude the ability to capture an image of sufficient quality to enable image analysis, the presently disclosed inventive concepts may nonetheless provide an accurate image analysis result, e.g. based on analyzing metadata associated with the image and/or provided from the client side 302.

Such metadata may, for example, identify location information concerning the client at the time of the capture operation or at the time of submitting an image analysis and/or processing request, such as mobile device GPS coordinates, mobile device position, azimuth, orientation of the capture device optical sensors, users' native or desired destination language (i.e. the language into which text should be translated), metrics describing the captured image (e.g. illumination, color depth, resolution, aspect ratio, contrast, orientation, etc.), and/or any other suitable metadata content as described herein and as would be understood by a person having ordinary skill in the art as suitable for use in performing image analysis and/or processing according to the instant descriptions and upon reading the present disclosure.

In some approaches, providing accurate image analysis results may be accomplished using only metadata, in which case the presently disclosed inventive concepts further improve the function of image analysis systems by enabling accurate image analysis results without requiring the transfer of significant quantities of data (e.g. image data) between the client and server sides of the system. For instance, metadata regarding image quality and/or capture location (position, orientation, etc. as noted above) may be provided prior to transferring the image data from the client side 302 to the server side 304. By analyzing the metadata, the server side 304 may determine whether a previous image analysis corresponding to a same or very similar capture location has been accomplished, and if so provide the image analysis result to the client side 302 without requiring any image data transfer. Similarly if image data quality are insufficient, the server side 304 may request the user alter the image or capture another image for image analysis, thereby avoiding the need to transmit image data which are not suitable as input for image analysis over the network. This may reduce overall network traffic, as well as serve the user's advantage by reducing amount of data usage consumed to accomplish the analysis and/or associated workflow task(s).

Returning now to FIG. 3, an analysis and/or processing platform 300 client side 302 includes a plurality of components such as modules, logic and/or devices (which may be physical devices or virtualized devices, in various approaches and may have associated therewith corresponding modules). The modules, logic and/or devices of the client side 302 are generally configured to capture image data depicting text to be translated, interface with the server side 304 via the network, provide captured image data and associated metadata to the server side 304, and receive image analysis and/or processing results from the server side 304 via the network.

While FIG. 3 and the platform 300 shown therein is referred to in some exemplary embodiments as a "platform," it should be understood that various additional and/or alternative embodiments of the presently disclosed inventive concepts may include platforms configured to facilitate or perform other workflows, such as financial document processing, and therefore the platform 300 shown in FIG. 3 may alternatively be a financial processing platform, and image analysis platform, etc. as would be appreciated by a person having ordinary skill in the art upon reading the present descriptions.

Accordingly, in various alternative embodiments, modules that are described herein below as performing translation-specific tasks (such as converting extracted text from a source to a destination language using analysis and/or processing models 356n stored in an analysis and/or processing module 356, where the analysis and/or processing involves translation and thus may use translation models stored in a translation module) may be supplemented by and/or substituted for other modules configured to perform other analysis- and/or processing-specific tasks, e.g. converting image data from one format to another (such as to different color depths, resolutions, representations of illumination characteristics, orientations, croppings, etc.) using image processing models, etc. As will be described in further detail below, the client side 302 in preferred embodiments conveys a significant advantage and improvement to analysis and/or processing platform 300 functionality by providing metadata descriptive of captured image data and/or conditions relating to capture of the image data. These data may, in some embodiments, be critical to determining appropriate substitute inputs and/or processing workflow operations to accomplish image analysis and/or operations of the associated workflow. Accordingly, in preferred approaches the metadata generated by the client side 302 facilitates substitution of inputs for various image analysis and/or processing workflows such as machine translation, as well as providing intelligent selection of inputs for improving the function of image analysis systems by reducing computational cost, network bandwidth and/or data usage.

With continuing reference to FIG. 3, in one embodiment the client side 302 of analysis and/or processing platform 300 includes a client graphical user interface (GUI) 306 to facilitate the user interacting with the platform 300 via the workstation, mobile device, or other physical or virtualized device upon which client side 302 is embodied. The client GUI 306 is configured so as to be communicatively coupled to a capture device 308, a condition evaluator 312, and a user module 318 of the client side 302.

For instance in one embodiment the user may interact with the client GUI 306 (e.g. by invoking and app installed on the mobile device, via a call to the OS, launching a program on a workstation, etc.) and in the process of seeking an image analysis and/or processing or other workflow such as processing information from a financial document, may invoke the capture device 308 of the client side 302 to capture image data depicting the textual information for which translation or other analysis, processing, etc. is sought.

The client GUI 306 may also facilitate defining various parameters relevant to the image analysis and/or workflow. For instance in the case of machine translation, parameters may include a user's native languages, secondary languages, default locations, permissions to access location and/or personal information, permissions to enable or disable real-time translation input selection (including selecting between image data and metadata, selecting only metadata, and/or replacing or substituting captured image data with image data from a repository, etc. as described in further detail herein), sharing settings, etc. as may be useful to accomplish accurate, efficient machine translation using the platform 300, in preferred approaches.

Of course, in other contexts different parameters may be employed without departing from the scope of the present disclosures. Regardless of the particular type of workflow, certain parameters such as default locations, permissions to access location and/or personal information, permissions to enable or disable real-time input selection (including selecting between image data and metadata, selecting only metadata, and/or replacing or substituting captured image data with image data from a repository, etc. as described in further detail herein), sharing settings, etc. may be representative of such "common parameters" that may be useful across various workflow contexts.

To facilitate image analysis and/or processing in a manner appropriate for the individual engaging the platform 300, e.g. to ensure image analysis and/or processing are made to the correct destination format, the client GUI 306 is also communicatively coupled to the user module 318 according to preferred embodiments. The user module 318 may include a plurality of user profiles and/or settings 318*a*, 318*b*, 318*c* . . . 318*n*.

In the exemplary context of translations, each profile and/or group of settings 318*a* . . . 318*n* may include information regarding individual users such as native language, languages which the user may speak and/or read (whether native or non-native), degree of fluency in various respective languages, desired destination language for translations, language spoken in the user's place of current residence, etc. as would be understood by a person having ordinary skill in the art upon reading the present disclosures.

In embodiments where the workflow involves tasks other than translation, profiles and/or groups of settings 318*a* . . . 318*n* may include information regarding individual users that is useful in the context of the particular workflow. For instance, information (optionally uniquely) identifying the user such as name, social security number, driver license number, address, etc.; financial information such as account number, routing number, etc.; or any other information about the user that may facilitate performing the particular workflow may be included in the profile and/or group of settings 318*a* . . . 318*n*. Any one or more of the foregoing information types may be leveraged in any combination for translation without departing from the scope of the presently disclosed inventive concepts.

In more embodiments, profiles and/or groups of settings 318*a* . . . 318*n* may include information regarding image processing parameters, such as preferred characteristics of images and/or information extracted therefrom for the purpose of performing a downstream workflow.

The user module 318 may also facilitate providing feedback regarding image analysis, and/or workflow processing results (e.g. translation results, desired destination language, etc.) to the client side 302 via the feedback agent 322, and therefore may be communicatively coupled to the feedback agent 322. Feedback e.g. regarding image analysis, workflow processing, and/or translation results may therefore optionally be stored in a corresponding user profile and/or group of settings 318*a* . . . 318*n*, in various embodiments. For instance, results received from the server side 304 via the network may be provided to the client side 302 via a receiver module 320, which may communicate such results to the user module 318 for storage in the appropriate user profile and/or group of settings 318*a* . . . 318*n*, and optionally provided to the feedback agent 322 for requesting user feedback and returning such feedback to the server side 304.

In another embodiment the client GUI may instruct, e.g. in response to a user invoking the capture device 308, the condition evaluator 312 to analyze and/or record conditions relevant to image analysis, workflow processing, and/or machine translation, etc. (e.g. time of day, weather, location information, network connectivity and/or speed etc.). Thus the condition evaluator 312 may be in communication with other sensors, components, and/or software (e.g. weather applications, map applications, etc.) resident on the client side 302 or mobile device/workstation upon which client side 302 is embodied. These other sensors, components, and/or software are not depicted in FIG. 3 and may include any known sensors, components, and/or software as would be understood by a person having ordinary skill in the art upon reading the present descriptions. The condition evaluator 312 may provide condition data to an image submitting module 314 for communication thereof to the server side 304, in various embodiments.

Preferably, the condition evaluator 312 may provide an instruction to the image submitting module to enable input selection and/or replacement in response to detecting particular conditions associated with a request, such as a time of day being outside a predefined suitable capture time window (e.g. excluding hours where insufficient daylight or other ambient light is available to capture high quality images) or weather at time of capture indicating poor image quality (such as fog, rain, snow, smog or other conditions likely to negatively impact image quality).

Client side 302 may also include a metadata generator 310 in communication with the capture device 308 and/or image submitting module 314. The metadata generator 310 preferably generates metadata relevant to image analysis, workflow processing, and/or machine translation, etc., particularly camera input-based analyses, processing, etc. As such, metadata generator 310 may be configured to determine and/or receive, e.g. from the capture device 308, and/or other sensors, components and/or software of the mobile device such as an accelerometer, GPS receiver, gyroscope, barometer, compass, etc. (not shown in FIG. 3) information relevant to image analysis, workflow processing, and/or machine translation, etc., generate metadata descriptive of such information, and pass the metadata on to the image submitting module 314, optionally in association with the image data captured using the capture device 308. Alternatively or additionally, the metadata generator 310 may receive requests for metadata from the image submitting module 314 and provide metadata in response to the request.

Accordingly, exemplary metadata which may be generated by metadata generator 310 may encompass any single data point or combination of data descriptive of: capture device position (e.g. GPS coordinates from a GPS receiver); capture device orientation (e.g. facing direction as may be determined from the compass); capture azimuth (e.g. as may be determined using the compass and/or gyroscope); image resolution (e.g. as may be reported by the capture device); capture flash setting (e.g. as may be reported by the capture device); image illumination level (e.g. as may be reported by the capture device), or any other suitable type of metadata descriptive of image capture characteristic.

Upon receiving the image data, generated metadata, and/or condition data from the metadata generator 310 and/or condition evaluator 312, the image submitting module 314 assembles appropriate information into an analysis, processing, etc. request, and submits the request to the server side 304 via the network. As will be understood more clearly upon reviewing the present disclosures in their entirety, the image submitting module 314 may submit such information in a single request, as multiple parts of a single request, or as multiple requests, e.g. by submitting metadata and/or condition data prior to transmitting image data in order to reduce network bandwidth consumption and data usage, as well as to reduce computational cost of accomplishing image analysis and/or workflow processing.

Figure 4:
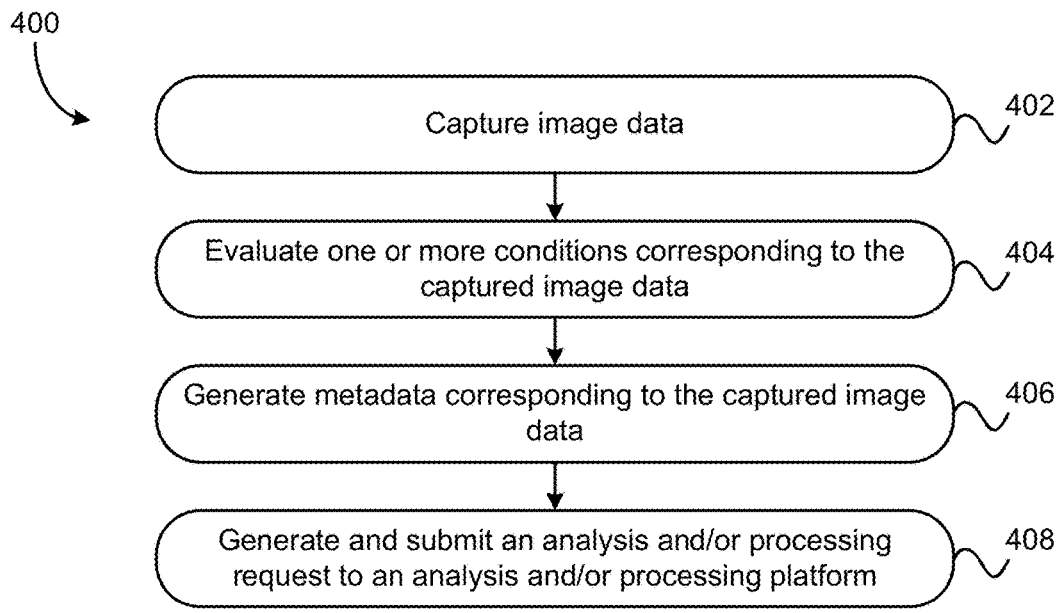
FIG. 4 is a flowchart of a method for generating and submitting an analysis and/or processing request to an analysis and/or processing result platform, according to one embodiment.

Now referring to FIG. 4, a flowchart of a method 400 for proactively improving analysis and/or processing in real time by generating and submitting an analysis and/or processing request to an analysis and/or processing platform is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed using a platform 300, and particularly any one or more of the modules client side 302 of a platform 300 such as depicted in FIG. 3 and described hereinabove. Of course, some other device or architecture having one or more processors therein and which would be understood by a skilled artisan reading the instant descriptions as suitable for performing the method 400 may also be employed without departing from the scope of the instant disclosures. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where image data are captured, e.g. using an image capture device 308 as shown in FIG. 3. The image data may be captured in any suitable format, and have any suitable characteristics for analysis and/or processing based on the image data, e.g. a particular capture resolution, color depth, aspect ratio, illumination level, etc. as would be understood by a person having ordinary skill in the art upon reading the present descriptions. In preferred embodiments the image data are captured using a mobile device.

Method 400 also includes operation 404, in which one or more conditions corresponding to captured image data are evaluated, e.g. via the condition evaluator 312 as shown in FIG. 3. Conditions evaluated in operation 404 may optionally include any one or combination of conditions described herein, and preferably include conditions such as timing conditions relating to capture (e.g. time of day), environmental conditions relating to capture (e.g. regarding weather, illumination, etc.) and/or network conditions relating to capture (e.g. regarding connection status, data usage, connection speed, etc.).

In operation 406 of method 400, metadata are generated, e.g. using a metadata generator 310 as shown in FIG. 3, where such metadata correspond to the captured image data. Metadata generated in operation 406, according to various embodiments, may include any suitable type of metadata disclosed herein, and preferably are selected from among data descriptive of the captured image data and/or descriptive of the image capture operation. For instance, exemplary metadata may include image characteristics such as resolution, illumination, color depth, aspect ratio, position/location information, orientation information, azimuth, flash setting, etc. as would be understood by a person having ordinary skill in the art upon reading the present disclosures.

With continuing reference to FIG. 4 method 400 includes operation 408, in which an analysis and/or processing request is generated, and submitted to an analysis and/or processing platform. For instance, an analysis and/or processing request may be generated based on captured image data, associated condition data and/or generated metadata produced respectively by image capture device 308, metadata generator 310, and/or condition evaluator 312 and assembled for submission via a network to server side 304 of platform 300 by an image submitting module 314.

Of course, the method 400 may include any number of additional and/or alternative operations, features, and characteristics as described herein, in various embodiments. In one approach, method 400 may include one or more operations following submission of the image analysis and/or processing request, such as receiving an analysis and/or processing result from the analysis and/or processing platform.

The result may be returned simply for purposes of conveying the desired information to a user, but in more approaches returning results may be part of a user feedback process/mechanism to improve performance of the platform 300. Accordingly, in more embodiments method 400 may include receiving user input comprising a confirmation, a negation, or a modification of the analysis and/or processing result; and submitting the user input to the platform performing the analysis and/or processing. The user input are preferably utilized by the platform to adjust one or more parameters associated with processing future requests, for instance by modifying an analysis and/or processing result $366n$ stored in an analysis and/or processing repository 366, by modifying or influencing a ranking of one or more image data and/or metadata records $346n$ stored in image data and/or metadata repository 346, by modifying or defining one or more settings associated with profiles 330, rules 332, and/or user characteristic profiles 334, etc. as described herein and would be understood by a person having ordinary skill in the art upon reading the present disclosures.

The repositories 346, 356 and/or 366 may be established at the time of initialization to provide a robust platform 300 without requiring substantial user input. Additionally and/or alternatively, repositories may be periodically and/or iteratively updated to ensure the available replacement inputs and associated analysis and/or processing information are accurate and comprehensive.

The image data and/or metadata repository 346 preferably comprises image data received from users of the platform in the course of requesting analysis and/or processing, and optionally further includes image data gathered by the platform from other sources, such as social media, geolocation services (e.g. map databases, services, etc.), and/or other known sources of image data.

More preferably, the image data and/or metadata repository 346 includes metadata descriptive of the image data and stored in association with the image data in the image data and/or metadata repository 346. The metadata may include any suitable descriptive information regarding the image, and preferably include information descriptive of the subject of the image, image quality, image capture characteristics and or conditions (such as GPS location, camera position, azimuth, orientation, capture time, ambient lighting and/or environmental factors including weather, pollution, etc.), and equivalents of any of the foregoing descriptors as would be understood by a person having ordinary skill in the art upon reviewing the instant disclosures. In some approaches, image data received or collected from sources outside the platform may be received and/or collected in connection with any suitable metadata descriptive of the image data.

In more approaches, and as will be discussed further below regarding the analysis and/or processing repository 366, the image data and/or associated metadata are preferably associated with a unique image identifier for each image stored in the image data and/or metadata repository 346. The image identifier may facilitate facile and rapid retrieval of prior analysis and/or processing results and/or identifying suitable images to use as a substitute input for requests submitted with inferior or inadequate image data, or to reduce computational cost of returning an analysis and/or processing result to the requester.

The analysis and/or processing repository 366 preferably includes one or more analysis and/or processing results 366n corresponding to information depicted in and/or extracted from image data stored in the image data and/or metadata repository 346 and/or corresponding to information received in connection with an analysis and/or processing request. Preferably, the information derived from a particular image is stored in the analysis and/or processing result repository 366 in association with an analysis and/or processing result identifier, which more preferably is associated with a corresponding image identifier mapping the result in the analysis and/or processing repository 366 to the image in the image data and/or metadata repository 346 from which the information was derived.

In particularly advantageous embodiments, the analysis and/or processing repository 366 includes a plurality of analysis and/or processing results 366n for each image to which the analysis and/or processing results correspond. Each analysis and/or processing result associated with the particular image may represent an output of an image analysis operation, workflow processing, etc.

In this manner, and in the exemplary context of machine translation, translation information in many different languages may be provided based on a single submission of an image with a translation request, thereby avoiding the need to receive and/or store multiple images of the same subject and/or textual information in the platform 300. Similarly, analysis and/or processing information may be provided in various different forms based on a single submission of an image with an analysis and/or processing request, conferring similar advantages in other embodiments.

Preferably, each analysis and/or processing result 366n is stored in the analysis and/or processing repository 366 in association with a unique analysis and/or processing identifier. The analysis and/or processing identifier may preferably uniquely identify parameters and/or operations to be utilized in the course of analysis and/or processing, e.g. for machine translation the source language (i.e. language in which the text was extracted from the image), the destination language (i.e. language into which the extracted text was translated), and/or the translation model used to perform the translation. In other embodiments, the unique analysis and/or processing identifier may uniquely identify one or more image analysis and/or processing operations to be performed, such as image quality analysis, color conversion, image rectification, data extraction, etc. and/or workflow processing tasks such as converting extracted information from a source format to a destination format, parsing extracted information, submitting extracted information to particular entities, etc. as will be appreciated by a person having ordinary skill in the art upon reading the present disclosures. Optionally, the analysis and/or processing identifier may additionally and/or alternatively identify or correspond to a data identifier associated with information extracted from the image, and/or an image identifier associated with the image from which the information were extracted.

For instance, in one approach an extraction identifier may be associated with the information extracted from each respective one of the one or more images; and the information extracted from each respective one of the one or more images may be stored in association with the respective different extraction identifier in an extracted information repository (not shown).

In this manner, each identifier may be utilized to map the image, extracted information, analysis result and/or processing result to one another, which advantageously allows facile and efficient identification of the image and associated analysis and/or processing results subsequently. As described further elsewhere herein, such techniques improve the computational efficiency and reduce the network usage/bandwidth required to accomplish accurate image processing and analysis and associated workflow tasks using a platform such as platform 300.

In more embodiments, and in order to facilitate improved computational efficiency and/or network/data usage for purposes of achieving analysis and/or processing, generating and submitting the analysis and/or processing request may be performed as a multi-stage process. For example, metadata may be submitted and analyzed prior to image data in order to determine whether a less computationally expensive process may be utilized to accomplish accurate analysis and/or processing results. In such cases, method 400 may include submitting the metadata corresponding to the captured image data to the analysis and/or processing platform; receiving an indication from the analysis and/or processing platform that analysis and/or processing may not be accomplished using the submitted metadata; and submitting the image data to the analysis and/or processing platform in response to receiving the indication that the metadata are not suitable for generating an appropriate analysis and/or processing result or estimating an analysis and/or processing result.

Returning to FIG. 3, and referring now to the server side 304 of platform 300, as shown in FIG. 3 the server side 304 includes a plurality of modules and/or logic configured to perform one or more operations and facilitate processing of requests such as analysis and/or processing requests, machine translation requests, etc. from the client side 302 to improve functionality, inter alia by allowing substitution of inputs for analysis and/or processing as well as intelligent selection of inputs for improving the function of analysis and/or processing systems by reducing computational cost, network bandwidth and/or data usage.

Platform 300 server side 304 includes a daemon 324 configured to handle inputs, e.g. inputs received from the image submitter module 314 of client side 302 via the network, as well as output APIs for accomplishing image analysis and/or processing of the inputs. The daemon 324 is preferably further configured to manage image replacement for analysis and/or processing such as translations in real-time. As such, daemon 324 is preferably coupled to at least the network facilitating data transfer between the client side 302 and the server side 304.

As shown in the embodiment of FIG. 3, the daemon 324 is also communicatively coupled to an input receiver module 336 and a manager module 326. As will be understood by a skilled artisan reading the instant descriptions, the daemon 324 may be communicatively coupled to the input receiver module 336 to provide appropriate inputs to the input receiver module 336 for processing in association with an analysis and/or processing request received from client side 302 via the network.

The manager module 326 and daemon 324 may optionally be configured to exchange communications with one another in a two-way path. For instance, the daemon 324 may output APIs to the manager module 326 and/or manage real time image replacement operations via communications sent to the manager module 326, in various embodiments. Conversely, the manager module 326 may configure APIs received from the daemon 324.

Generally speaking, the manager module 326 is preferably configured to manage the services provided by the platform 300, and particularly by server side 304 to the end user via the network and client side 302. This management includes tasks such as configuring APIs (as noted above), configuring user profiles, configuring rules, and/or configuring profiles, in various embodiments. As such, the manager module 326 is optionally but preferably communicatively coupled to a configuration module 328 which, in turn, is communicatively coupled to and configured to define, set, update, adjust, and modify profiles 330, rules 332, and/or user characteristic profiles 334 stored within the platform 300. For instance, the configuration module 328 may perform any one or more of the foregoing management operations in response to receiving instructions to define or change settings that impact the function of the platform 300, and particularly image analysis and/or processing tasks performed thereby.

The configuration module 328 may also be communicatively coupled to the manager module 326 to facilitate two-way information exchange. For instance the configuration module 328 may report current settings regarding profiles 330, rules 332, and/or user characteristic profiles 334 to the manager module 326 to facilitate comparison of image analysis and/or processing results with settings, determining whether and if so how to modify various settings, etc. as would be understood by a person having ordinary skill in the art upon reading the present disclosures.

As described herein, profiles 330 may be understood as including one or more profile entries, optionally arranged in sets, which facilitate configuration and control of the platform 300. For instance, settings reflected in the profiles 330 may control the destination language to which text represented in a source language is translated, may define priority or assign weights to different measures in determining which input(s) to use for image analysis and/or processing of image data captured by the user of the device hosing the clients side 302 etc. as would be understood by a skilled artisan upon reading the instant descriptions. As such, profiles 330, in various embodiments may include any combination, permutation, etc. of characteristics, settings, information, etc. such as location information, location profiles (e.g. information describing landmarks, places of business, etc. nearby, such as useful for providing contextual information as described herein), image processing settings to utilize in connection with image inputs corresponding to particular locations, whether substitute inputs are enabled, etc.

rules 332, in preferred approaches may be understood as including one or more parameters, algorithms, or other controlling function for enabling input replacement and/or configuring suitable input replacement (e.g. defining type(s) of input replacement which are permissible such as substituting image data for metadata, metadata for image data, metadata for metadata, image data for image data, whether any particular type of data is permissible for substitution purposes, etc.).

In further embodiments rules 332 may additionally and/or alternatively include rules that dictate one or more criteria by which image and/or metadata similarity is evaluated and corresponding image data and/or metadata are identified for purposes of substitution in the platform workflow. For instance, one or more thresholds defining requisite degree of similarity of image data and substitute image data, or metadata and substitute metadata, may be defined via the rules 332.

Further still, rules 332 may include guidelines for determining how particular analyses and/or processing tasks (e.g. previously performed translations) correspond to particular image data, metadata (particularly location data, position data regarding the capture device 308, etc. as described herein and would be appreciated by a skilled artisan upon reading the instant disclosures), or combinations there, in various embodiments.

User characteristic profiles 334 generally include personal information specific to different users and which facilitate or define the manner in which image analysis and/or processing is accomplished by the platform 300. For instance, in different approaches user characteristic profiles 334 may include personal information potentially including identifying information such as name, address, social security number, driver license number, etc.; financial information such as account number, routing number, credit score, available funds, etc.; linguistic information such as native language, current place of domicile, languages spoken by the user, languages read by the user, level of fluency in one or more languages, a default or user-defined destination language to which source language text should be translated, capture device characteristics (such as native resolution, default color depth, gamma, etc.), network connection type (e.g. as may be indicative of network connection speed), data usage preferences and/or limits, user preferences regarding enabling or disabling any features described herein (such as intelligent input selection and/or input replacement), etc. as would be understood by a person having ordinary skill in the art upon reading the instant disclosures.

Any one or combination of the profiles 330, rules 332, and characteristic profiles 334 may optionally be communicatively coupled to an image classifier module 340 which will be described in further detail below. In preferred embodiments, at least the rules 332 are communicatively coupled to the image classifier module 340, e.g. in order to define or modify rules that dictate criteria by which image similarity is evaluated and corresponding image data are identified for purposes of substitution in the platform workflow. For instance, rules 332 may define criteria for the image classifier module 340 to utilize in determining which class an image belongs to, whether images belong to the same class or depict an object (e.g. a building, sign, street, etc.) of the same classification, etc. as would be understood by a person having ordinary skill in the art upon reading the present descriptions. The image classifier module 340 will be described in further detail below regarding updating and/or building the image data and/or metadata repository 346.

Returning now to the processing of inputs received from the client side 302 via the network, and in particular inputs including image data, input receiver module 336 is, according to preferred embodiments, configured to respond to analysis and/or processing requests received from the client side 302 and receive camera input image data as well as any related metadata that may have been submitted with the request. For instance, and as suggested above the input receiver module 336 may receive inputs via the daemon 324, in one embodiment. In various approaches and as described further herein, in order to facilitate improvements to the function of the platform 300, the input received by the camera input receiver may include metadata alone, image data alone, image data in association with metadata, or any suitable combination of input data as described herein and would be appreciated by a person having ordinary skill in the art upon reading the present disclosures.

The input receiver module 336, in various embodiments, is configured to receive input of any suitable type for purposes of performing analysis and/or processing such as machine translation using the platform 300. In particular, the input receiver module 336 is preferably configured to receive input comprising metadata, image data, image data and metadata (optionally in association with one another), or any combination of suitable types of input as described herein. In particularly preferred approaches the input receiver module 336 may be configured to receive metadata descriptive of capture conditions, such as metadata generated by the metadata generator 310 and/or condition evaluator 312 of client side 302.

Input receiver module 336 as shown in the embodiment of FIG. 3 is communicatively coupled to an image quality control module 338, and may communicate data such as the image data and/or metadata received via the daemon 324 to the image quality control module 338. The image quality control module 338, in turn, is preferably configured to receive such input and perform one or more quality analysis procedures, e.g. to determine image resolution, color depth, contrast, illumination characteristics, presence of edges, etc. and facilitate determining whether particular image data are suitable for analysis and/or processing such as machine translation, e.g. of sufficient quality to allow accurate extraction of textual or other information from the image data.

The determination of whether image data are sufficient for analysis and/or processing such as image analysis, financial processing, and/or machine translation may be performed subsequent to, or in tandem with, another determination as to whether any metadata received at the input receiver module 336 are sufficient to generate an estimated analysis and/or processing result, such as an estimated translation of textual information that may be represented in the image data transmitted and/or captured by the user of the device hosting the client side 302. If image data are insufficient for such purpose, but metadata are sufficient to estimate an analysis and/or processing result (e.g. based on metadata sufficient to identify a similar image and/or translation result by location, orientation, position, etc.) then substitute inputs may be utilized for analysis and/or processing. Similarly, if metadata sufficient to accurately estimate an analysis and/or processing result are present then it may be advantageous to utilize substitute inputs where inputs of a higher quality are available to the platform 300, or even to forego image processing to extract text from the image data submitted to the daemon 324 and/or input receiver module 336 such as where a previous analysis and/or processing result accomplished based on substantially the same image data is already available to the platform 300 without processing the image.

Accordingly, image quality control module 338 preferably includes, or is coupled to logic 348 for determining whether image data are insufficient for analysis and/or processing and/or whether metadata are sufficient to estimate an image analysis and/or processing result. Based on a result of either or both of these determinations, the image quality control module logic is further configured to determine how to proceed with analysis and/or processing such as machine translation. For example in one embodiment based on image quality and/or type of metadata received at the input receiver module 336, the logic 348 is preferably configured to determine whether or not to proceed with image analysis and/or processing via extracting information from the image data.

If analysis and/or processing is to proceed by extracting information from the image data (e.g. in response to determining image data are of superior or sufficient quality for extraction, or that metadata are insufficient to estimate an image analysis and/or processing result), the logic 348 may direct the translation process to proceed via operation 350 which includes extraction of information from the image data and subsequent image analysis and/or processing of extracted information, optionally using any number of image analysis and/or processing models in the context of image analysis and/or processing, e.g. image analysis and/or processing models $356n$ of image analysis and/or processing module 356. For the purposes of operation 350 alone, any suitable technique as would be known in the art for extracting textual or other information and analyzing and/or processing such information may be employed without departing from the scope of the present disclosures.

In some embodiments, and according to operation 358 upon analyzing and/or processing the extracted information, e.g. converting extracted text to one or more formats, using the image analysis and/or processing models $356n$, converting image data from one format to another (such as to different color depths, resolutions, representations of illumination characteristics, orientations, croppings, etc.) using image processing models; the analysis and/or processing result may be stored in analysis and/or processing repository 366, and/or the image data, associated metadata, etc. used to generate the analysis and/or processing result may optionally be stored in image data and/or metadata repository 346 for subsequent utilization, e.g. as substitute inputs for a subsequent analysis and/or processing request.

Subsequent lookup may improve computational efficiency of the analysis and/or processing service, as well as to enable analysis and/or processing based on metadata, e.g. when the image quality is insufficient to support tasks such as image conversion, text extraction, translation, etc. using more conventional approaches. To facilitate such advantages, the analysis and/or processing results may be each stored in association with a unique analysis and/or processing results identifier which may identify parameters of the analysis and/or processing (e.g. source and/or destination format, language, image processing and/or translation model, etc.) and/or be utilized to map the analysis and/or processing result to the information (e.g. extracted text) based upon which the analysis and/or processing was produced and/or identify the image from which the information were obtained.

In various embodiments, source and destination languages of the translation models may respectively be selected based on user-defined preferences (e.g. native language), location data corresponding to the mobile device or the location where the image was captured, etc. In other approaches, source and destination formats for image data, for information extracted from image data, etc. may be selected based on user-defined preferences. Further still, in preferred embodiments particularly process flows (e.g. a series of operations to be performed in the course of completing a financial transaction such as authenticating information submitted to the workflow, completing a transfer of funds, etc.) may be selected based in whole or in part on user-defined preferences.

If analysis and/or processing is to proceed by techniques other than extracting information from the image data (e.g. in response to determining image data are of insufficient or inferior quality to accurately extract information therefrom, or metadata are sufficient to estimate an image analysis and/or processing result), the logic 348 may direct the analysis and/or processing to proceed via operation 352 which includes attempting to directly locate a previously analysis and/or processing result corresponding to the input image for which analysis and/or processing is presently sought.

For example, in various embodiments a previously analyzed and/or processed result may be identified based on similar metadata as submitted with the current analysis and/or processing request, particularly based on metadata reflecting information such as location, orientation, and perspective information. In such situations, operation 352 may leverage other modules described herein (and which may or may not be shown in FIG. 3) to match input metadata with other analysis and/or processing results e.g. via metadata or an identifier associated with another image representing the information, which in turn may be mapped to a particular analysis and/or processing result produced using such image data.

If operation 352 does not yield a corresponding and appropriate previously analysis and/or processing result, then the non-extraction based analysis and/or processing process may proceed via operation 354, in which the server side 304 attempts to locate image data similar to the input image data and/or metadata, such image data being optionally and preferably stored in an image and metadata repository 346 comprising a plurality of records 346n each in turn comprising image data and/or associated metadata. Accordingly, operation 354 may involve performing one or more analyses to determine image and/or metadata similarity based on known image analysis techniques (such as may be employed by image classifier module 340 in some embodiments). Such analysis is preferably performed using normalized image data and/or metadata from the repository 346, such normalization being accomplished using image data normalizing module 344.

In various illustrative embodiments, server side 304 may therefore further include the image classifier module 340 mentioned above, which may be communicatively coupled to an image identifier managing module 342 and which is in turn communicatively coupled to an image data normalizing module 344. The image data normalizing module is communicatively coupled to the image data and/or metadata repository 346 to form a pathway from image classifier module 340 to image data and/or metadata repository 346.

In operation, and according to one embodiment image data and/or input metadata may be received at the image classifier module 340 from the input receiving module 336 either in the course of performing a analysis and/or processing request or in the course of building or updating the image data and/or metadata repository 346. The image data may be classified using said image classifier module 340 and based on analyzing the image data and/or metadata. Based on the result of the classification and/or the metadata (whether or not such metadata were leveraged in determining the image classification), the image data may be associated with a unique image identifier by image identifier managing module 342. The unique identifier facilitates subsequent use of the image data as a substitute input for subsequent analysis and/or processing requests, for ranking purposes, etc. as will be appreciated by skilled artisans upon reading the present disclosures. Image data (and optionally associated metadata) may then be normalized according to image data normalizing module 344.

Normalizing image data and/or metadata to be included in the repository conveys the advantage of enabling the best image(s) and descriptive information concerning a particular subject, location, etc. to be used in analysis and/or processing. This further improves the function of the image analysis and/or workflow processing system (e.g. platform 300) by ensuring that a high-quality input may be utilized for analysis and/or processing, e.g. a daytime photo may be used for analysis and/or processing in response to a user submitting an analysis and/or processing request (including an image, likely of poor quality) at a time of day when ambient lighting is insufficient to produce an image of sufficient quality for analysis and/or processing.

Similarly in preferred approaches normalizing allows embodiments where a clear image may always be used despite a user submitting an analysis and/or processing request including an image taken during inclement weather, which renders the image of insufficient quality for analysis and/or processing.

Further still, and especially when considering images captured using a camera such as typically embodied in a mobile device, images taken under ideal ambient conditions may nonetheless include distortions, and/or may not capture all content desired/necessary for analysis and/or processing.

For instance, and as is known in the art, perspective distortions are particularly challenging in the context of recognizing, extracting, and manipulating textual information represented in image data. Indeed, this is one reason that automated techniques for distinguishing human from machine actors (e.g. CAPTCHA®) utilize distorted images as the test prompt.

Image normalization may address the challenges associated with distortions and/or incomplete representations of text in image data submitted to the solution. For instance, where portions of an object depicted in the image, and/or textual information is cut-off, or sufficiently distorted that analysis and/or processing such as image processing, financial processing, and/or machine translation is not achievable, an image taken from a different angle so as to reduce/remove the distortive effects, and/or include missing text, portions of the object, etc., may be substituted and thus the analysis and/or processing may be achieved without requiring the user to capture and submit a second image, As such, normalization represents a further improvement to the presently disclosed inventive systems and techniques, especially in circumstances where recapture/resubmission may not be possible.

In some approaches, normalization may include generating a composite image from multiple images included in the repository.

In other approaches, normalization may include determining, from among a plurality of images corresponding to a same location, subject, set or subset textual information, etc., which of the plurality of images are most suitable for analysis and/or processing, and ensuring those most suitable images are utilized for subsequent analysis and/or processing requests. For instance a ranking may be applied to various images in the repository, and substituting images from the repository for camera input provided by the user with the analysis and/or processing request may be performed according to the ranking, e.g. selecting the top ranked image, or from among the top ten ranked images, etc. as would be understood by a person having ordinary skill in the art upon reading the present disclosures.

The ranking may be determined automatically by the platform 300, e.g. based on analyzing the image and/or metadata associated with the image, according to one implementation. Accordingly, metadata may preferably include one or more indicia of image quality and/or capture parameters relevant to image analysis and/or processing, such as image capture time, location, position, orientation, azimuth, environmental conditions such as weather, lighting, etc. associated with image capture, image analysis and/or processing results achieved using particular images, and other parameters or indicia as would be appreciated by a skilled artisan reviewing these disclosures.

In more approaches, independent of the automated ranking or in addition to automated ranking techniques, user input or feedback regarding particular images and/or analysis and/or processing results achieved using particular images may be utilized to rank images in the repository.

User feedback or input, for example, may include a simple confirmation, modification, or negation of an analysis and/or processing result provided to the user in response to the user submitting an analysis and/or processing request to the platform. Images may be ranked, or ranking thereof influenced, based on accumulating user input/feedback over time in order to further improve the performance of the platform. Modifications, in various approaches, may include user-provided analysis and/or processing suggestions, a user's selection from among a plurality of possible analysis and/or processing results, etc.

Additionally and/or alternatively, in response to an analysis and/or processing attempt failing, and/or in response to user feedback indicating negation or modification of an image analysis and/or processing result produced by the platform, one or more candidate images from the image data and/or metadata repository may be presented to the user and the user may be instructed to select a substitute image from among the candidate images for purposes of performing analysis and/or processing. Based on the user's selection, and optionally further based on results and/or feedback regarding results of attempting analysis and/or processing with the substitute image, ranking of the selected substitute image may be determined and/or modified over time.

Of course, in more embodiments normalization may include both generating composite images, as well as determining suitability of images for analysis and/or processing and selectively substituting repository images for user-provided input, without departing from the scope of the presently disclosed inventive concepts.

Accordingly, and returning to operation 354, the non-extraction based analysis and/or processing preferably identifies a similar image and/or metadata, and based on such similar image and/or metadata identifies a corresponding analysis and/or processing result 366$n$ in analysis and/or processing repository 366. In order to identify the corresponding analysis and/or processing result 366$n$ from among the plurality of analysis and/or processing results, the image identifier of the image determined in operation 354 to be similar to the input image data and/or metadata may be mapped in operation 362 to a corresponding analysis and/or processing result identifier associated with the analysis and/or processing result 366$n$.

Based on the mapping, and according to one embodiment in operation 364 the analysis and/or processing result 366$n$ may be located within the analysis and/or processing result repository. Image analysis and/or processing information may be returned to the client side 302 via the network using return translated message module 360, according to one embodiment. The returned information may include analysis and/or processing result 366$n$, and/or may be an estimated analysis and/or processing result, in some approaches, while the information may comprise contextual information, in other approaches. For instance, where no similar image could be located in operation 354 the analysis and/or processing result provided to the client side 302 may include default contextual information about the location where the input image data were captured, in various embodiments.

Context is preferably determined based on predefined rules, e.g. report information relating to the location where the client device was present when the communication was sent, or where the image was taken (this location may be less precise than the position, azimuth, and orientation metadata utilized to identify similar images, but sufficiently precise to identify, e.g. the street name or city in which the device is located/image was captured). As such, and again in the context of machine translation, default and/or contextual information may include or be determined based at least in part on: default transliteration rules which identify a transliterated street name, building name, city name, etc.; default location rules which provide translated high level info such as city history, neighborhood info, list of nearby restaurants, retail stores, landmarks, tourist attractions, etc. based on location; and/or default advertising rules which facilitate presenting promotional offers (optionally based further on default location and/or default transliteration rules) in response to the translation request.

Of course, the above modules, operations, and/or logic may be implemented as a method on any device and/or system or as a computer program product, according to various embodiments.

Figure 5:
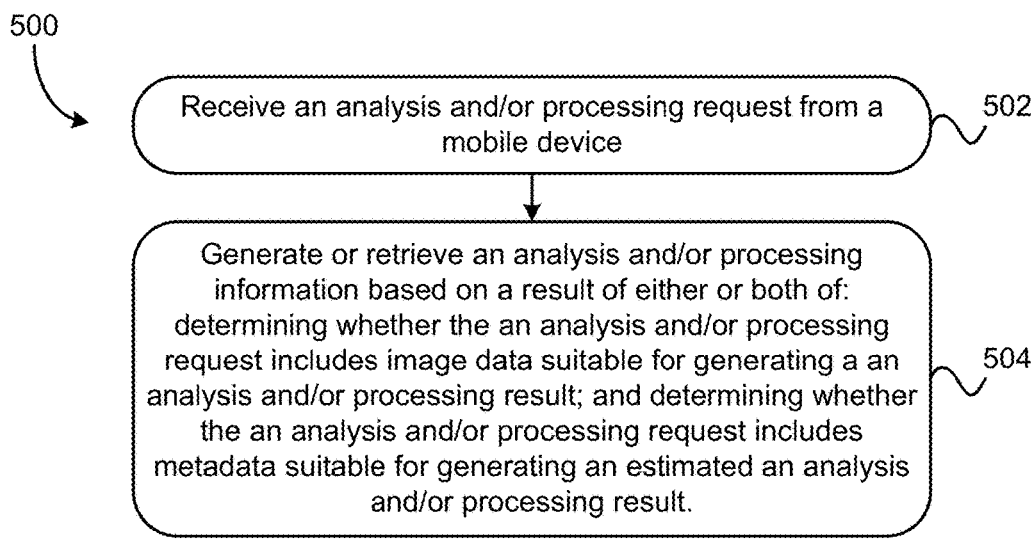
FIG. 5 is a flowchart of a method for processing an analysis and/or processing request using a platform to proactively improve analysis and/or processing in real time, according to one embodiment.

Now referring to FIG. 5, a flowchart of a method 500 or proactively improving analysis and/or processing in real time by processing an analysis and/or processing request is shown according to one embodiment. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed using a platform 300, and particularly a server side 304 of a platform 300 such as depicted in FIG. 3, or some other device or architecture having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in the embodiment depicted in FIG. 5, method 500 includes operation 502, where an analysis and/or processing request is received from a mobile device, e.g. a mobile device implementing components of the client side 302 of platform 300 as shown and described with regard to FIG. 3. The request may include any suitable input information, e.g. image data and/or metadata, condition data, instructions regarding whether to enable intelligent input selection, input replacement, user settings (e.g. regarding appropriate destination languages into which text should be translated), etc. as described according to various embodiments herein. Further, the request may be received in any suitable manner, and preferably is received via a network facilitating communication between client side 302 and server side 304 of the platform 300.

Method 500 further includes generating or retrieving analysis and/or processing information based on a result of a first determination, a second determination, or both in operation 504. The first determination includes determining whether the analysis and/or processing request includes image data suitable for generating an analysis and/or processing result; and the second determination includes determining whether the analysis and/or processing request includes metadata suitable for generating an estimated analysis and/or processing result. The determinations may be performed in any order, and any combination or permutation, without departing from the scope of the presently disclosed inventive concepts as embodied in method 500 of FIG. 5.

Of course, method 500 may include any suitable combination or permutation of additional or alternative operations, features, conditions, etc. as described herein without departing from the scope of the present disclosure. In various embodiments, method 500 may be characterized by including or featuring one or more of the following characteristics.

In one embodiment, the analysis and/or processing information generated or retrieved in operation 504 includes information selected from an analysis and/or processing result, an estimated analysis and/or processing result, and contextual information. The analysis and/or processing may be understood to include an analysis and/or processing result generated based on the captured image data, and optionally based on metadata/condition data associated with the captured image data, while estimated analysis and/or processing result(s) may be understood to include results retrieved based on similarity of the captured image data to previously captured image data (optionally stored in image data and/or metadata repository 346 and similarity of which may optionally be determined based on comparing image data, metadata, or both). Contextual information may include any suitable type of default or contextual information as described herein and equivalents thereof that would be appreciated by a person having ordinary skill in the art upon reading the instant disclosures.

Accordingly, retrieving contextual information may be performed in one embodiment in response to determining both: the analysis and/or processing request does not include image data suitable for generating an analysis and/or processing result; and the analysis and/or processing request does not include image metadata suitable for generating an estimated analysis and/or processing result.

In more embodiments, method 500 may optionally include, in response to determining the analysis and/or processing request includes image data suitable for analysis and/or processing, generating the analysis and/or processing information. Generating the analysis and/or processing information involves extracting information from the image data; analyzing and/or processing some or all of the extracted information using at least one of a plurality of analysis and/or processing models; and for each of the plurality of analysis and/or processing models used to analyze and/or process the extracted information, storing a corresponding analysis and/or processing result in an analysis and/or processing result repository.

In some approaches, image data may be sufficient to perform analysis and/or processing such as machine translation, but nonetheless it may be advantageous to accomplish analysis and/or processing without processing the image data, e.g. where similar image data have previously been processed and accurate analysis and/or processing results generated thereby. In such embodiments, computational efficiency of analysis and/or processing may be improved by locating the previously generated analysis and/or processing result instead of repeating image processing. Accordingly, method 500 may include, in response to determining the analysis and/or processing request includes image data suitable for analysis and/or processing, generating the analysis and/or processing information. Generating the analysis and/or processing information in such embodiments includes: determining whether an image corresponding to the image data included in the analysis and/or processing request exists in an image data and/or metadata repository; in response to determining the image corresponding to the image data included in the analysis and/or processing request exists in the image data and/or metadata repository, determining a corresponding image identifier; identifying previously analyzed and/or processed data based on the corresponding image identifier; and retrieving the analysis and/or processing information from the previously analyzed and/or processed data.

In further embodiments, method 500 may include generating the estimated analysis and/or processing result without performing analysis and/or processing based on captured image data. For instance, such an approach may be advantageous in response to determining both: the analysis and/or processing request does not include image data suitable for analysis and/or processing; and the analysis and/or processing request does include image metadata suitable for generating the estimated analysis and/or processing result. Thus, in this embodiment metadata (which may optionally include condition data generated by condition evaluator 312 and/or metadata generator 310) may serve as a replacement input for analysis and/or processing purposes.

Optionally, generating the estimated analysis and/or processing results may include: determining whether an image corresponding to the image data included in the analysis and/or processing request exists in an image data and/or metadata repository based at least in part on the image metadata; in response to determining the corresponding image exists in the image data and/or metadata repository, determining a corresponding image identifier; identifying previously analyzed and/or processed data associated with the corresponding image based on the corresponding image identifier; and generating the estimated analysis and/or processing results based on the previously analyzed and/or processed data.

Generating the estimated analysis and/or processing results based on the previously analyzed and/or processed data, in various embodiments, may include parsing some of the previously analyzed and/or processed data, converting the previously analyzed and/or processed data to a different format, etc. Generating estimated analysis and/or processing results may alternatively include simply retrieving the previous analysis and/or processing results as a whole and reporting such results back to the client.

Determining whether images correspond as suggested herein may be based on image classification indicating the corresponding image data in the repository depicts part or all of the same or substantially the same scene, e.g. building, street sign, place of business, public transportation station, etc. as the captured image. Alternatively, determining correspondence between images may be based on matching metadata and/or condition data associated with capture, preferably position/orientation/azimuth information.

In still more embodiments, e.g. where captured image data are of insufficient quality for analysis and/or processing, alternative input image data may be identified and processed. Accordingly, method 500 may optionally include, in response to determining the analysis and/or processing request does not include image data suitable for analysis and/or processing: determining whether an image corresponding to the image data included in the analysis and/or processing request exists in an image data and/or metadata repository 346; in response to determining the corresponding image exists in the image data and/or metadata repository, extracting information from the corresponding image;

analyzing and/or processing some or all of the extracted information using at least one of a plurality of analysis and/or processing models (e.g. analysis and/or processing model 356$n$ of analysis and/or processing model repository 356); and for each of the plurality of analysis and/or processing models used to analyze and/or process some or all of the extracted information, storing a corresponding analysis and/or processing result in an analysis and/or processing result repository 366.

The method 500 may also or alternatively include establishing and/or updating an image data and/or metadata repository; an extracted data repository; an analysis and/or processing result repository; or any combination thereof. As noted above establishing the repositories 346, 356, and/or 366 facilitates providing intelligent input selection and/or input replacement and improves the function of analysis and/or processing systems in accordance with the present inventive concepts.

In one approach, establishing and/or updating the image data and/or metadata repository 346 may be based at least in part on identifying superior or substitute image data inputs, and may include: receiving one or more images; receiving and/or generating metadata descriptive of each of the one or more of images (e.g. using or based on analyses performed using the image quality control module 338 and/or image classifier module 340), and associating the received and/or generated metadata with the image of which the metadata are descriptive.

The image data and/or metadata repository 346 establishment/update process may further include classifying at least some of the images, where the classifying is optionally based at least in part on the metadata associated with the respective image. In one approach, classifying may be based on metadata associated with the received image, e.g. metadata descriptive of image characteristics such as resolution, color depth, illumination, aspect ratio, etc. This classification may be further influenced based on settings defined in the profiles 330, rules 332, and/or user characteristic profiles 334, in several embodiments.

Further still, embodiments of establishing and/or updating the image data and/or metadata repository 346 may include associating a different image identifier with each classified image; and storing each classified image and the associated image identifier in the image data and/or metadata repository 346. Optionally, and preferably prior to storing the image data, associated metadata and/or unique image identifier in the image data and/or metadata repository 346, method 500 in one embodiment includes normalizing at least some of the classified images. Normalization conveys advantages explained in greater detail elsewhere herein, according to various embodiments.

Turning now to the analysis and/or processing result repository 366, in various embodiments establishing and/or updating the analysis and/or processing result repository 366 may include: receiving one or more images; extracting information depicted in each of the one or more images; analyzing and/or processing the information extracted from each respective one of the one or more images according to one or more of a plurality of analysis and/or processing models (e.g. analysis and/or processing models 356$n$ as shown in FIG. 3); associating a different analysis and/or processing result identifier with each result of analyzing and/or processing the information according to the one or more of the plurality of analysis and/or processing models; and storing each analysis and/or processing result and the associated image analysis and/or processing result identifier in the analysis and/or processing result repository 366.

Establishing and/or updating the analysis and/or processing result repository 366 may additionally and/or alternatively include: associating an analysis and/or processing result identifier with the information extracted from each respective one of the one or more images; and storing the information extracted from each respective one of the one or more images in association with the respective different analysis and/or processing result identifier in an extracted text repository. Establishing an analysis and/or processing result repository 366 in this manner may facilitate mapping images and/or analysis and/or processing results to each other, as well as performing additional analysis and/or processing of extracted information without needing to repeat the extraction process, in various embodiments.

In one particularly preferred embodiment, method 500 may proceed according to the following series of operations. In a first operation, input(s) received from the client side (e.g. client side 302) are evaluated to determine whether the input(s) include image data suitable for generating an analysis and/or processing result, e.g. image data that have sufficient resolution, clarity, illumination characteristics, or other suitable characteristics for extracting textual information therefrom, for converting from one image format to another, etc.

If the result of the first operation is a determination that image data suitable for analysis and/or processing are included in the input(s), then the method 500 may proceed via conventional analysis and/or processing, such as camera input machine translation services (CIMTS)-based machine translation. Conventional CIMTS-based machine translation may include extracting textual information from image data and translating extracted textual information using any suitable known technique(s) that would be appreciated by a person having ordinary skill in the art upon reading the present disclosures. Such conventional techniques may include character recognition such as OCR and/or ICR, NLP, machine translation, etc. and may be performed in any suitable manner such as described above with regard to FIG. 3 and particularly operation 350.

With continuing reference to the particularly preferred embodiment of method 500, if the first operation results in a determination that the input(s) do not include image data suitable for analysis and/or processing, then a second operation is performed, and includes determining whether the input(s) include metadata suitable for generating an estimated analysis and/or processing result, e.g. by identifying substitute input image data, corresponding previously performed analysis and/or processing operation or workflow, etc. as described herein and would be understood by a skilled artisan upon reading the instant descriptions.

Such metadata are ideally descriptive of the position or location where the input(s) were obtained (e.g. GPS coordinates where image data were captured); the orientation of the capture device when inputs were obtained (e.g. vertical, horizontal, and/or rotational angle between the capture device and the subject of the image data at time of capture, direction faced/viewed by capture device during capture; and/or the azimuth of the image data and/or subject thereof with respect to the capture device at time of capture.

According to such preferred embodiments, generating the estimated analysis and/or processing result includes identifying and returning previous analysis and/or processing results corresponding to a similar location, orientation, and/or or azimuth. For example, based on the metadata descriptive of the input(s), similar images in an image data and/or metadata repository 346 may be identified, and corresponding analysis and/or processing results generated. For example, similar images may be identified based on extraction of text or objects depicted in image data being identified by mapping image identifier(s) to translated message identifier(s), e.g. as described above regarding FIG. 3 and particularly operations/modules 352, 354, 362 and 364.

With still further reference to the particularly preferred embodiment of method 500, if the first operation and second operation each result in determining that the input(s) do not include image data or metadata suitable for analysis and/or processing, then default or contextual information may be provided to the client side 302. Default or contextual information may take any form as described herein, and generally includes information selected based on context of the original analysis and/or processing result request and/or associated input(s), such as user preferences, location information, orientation information, etc.

Meanwhile, and still according to the particularly preferred embodiment of method 500, the platform 300 is configured to build and iteratively update repositories including but not limited to an image data and/or metadata repository 346 and an analysis and/or processing result repository 366. Building the repositories is performed at initialization of the platform, while iterative updates may be performed according to needs of the platform, user-defined settings, or other suitable criteria.

Essentially, in one embodiment building and updating the repositories may include collecting image data and associated metadata from various sources such as online repositories and data received from clients of the platform 300; examining collected and received image data and associated metadata; classifying qualified images based on the image data and/or related metadata and saving classified images to the image data and/or metadata repository 346; indexing each classified image; extracting information from the classified, indexed images; indexing each set of extracted information and storing indexed information to an extracted information repository; analyzing and/or processing each set of extracted information; indexing each analysis and/or processing result achieved based on each respective set of extracted information; and saving each indexed result in an analysis and/or processing result repository 366.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for proactively improving image analysis and/or processing in real time by processing an analysis and/or processing request, the method comprising:
   receiving the analysis and/or processing request from a mobile device, the analysis and/or processing request including metadata and condition data each corresponding to an image for which analysis and/or processing is requested, and the analysis and/or processing request excluding the image;
   determining, based on the metadata, whether an analysis and processing result corresponding to the image exists in a database of analysis and processing results; and
   in response to determining the analysis and processing result corresponding to the image exists in the database of analysis and processing results:
      retrieving, without performing any analysis or processing of the image, the analysis and processing result corresponding to the image; or
      generating, without performing any analysis or processing of the image, an estimated analysis and/or processing result corresponding to the image, wherein the generating is based at least in part on the metadata.

2. The computer-implemented method as recited in claim 1, wherein the analysis and/or processing information comprises information selected from the group consisting of: the analysis and/or processing result, the estimated analysis and/or processing result, and contextual information; and the computer-implemented method further comprising:
   retrieving the contextual information in response to determining both:
   the analysis and/or processing request does not include image data characterized by an image quality which permits accurately generating an analysis and/or processing result; and
   the analysis and/or processing request does not include metadata which permits accurately generating an estimated analysis and/or processing result.

3. The computer-implemented method as recited in claim 1, comprising, in response to determining the analysis and/or processing request includes image data characterized by an image quality which permits accurately generating an analysis and/or processing result, generating the analysis and/or processing information, wherein generating the analysis and/or processing information comprises:
   extracting information from the image data;
   analyzing and/or processing some or all of the extracted information using at least one of a plurality of analysis and/or processing models; and
   for each of the plurality of analysis and/or processing models used to analyze and/or process some or all of the extracted information, storing a corresponding analysis and/or processing result in an analysis and/or processing result repository.

4. The computer-implemented method as recited in claim 1, comprising, in response to determining the analysis and/or processing request includes image data characterized by an image quality which permits accurate analysis and/or processing, generating the analysis and/or processing information, wherein generating the analysis and/or processing information comprises:

determining whether an image corresponding to the image data included in the analysis and/or processing request exists in an image data and/or metadata repository;

in response to determining the image corresponding to the image data included in the analysis and/or processing request exists in the image data and/or metadata repository, determining a corresponding image identifier;

identifying previously analyzed and/or processed data based on the corresponding image identifier; and retrieving the analysis and/or processing information from the previously analyzed and/or processed data.

5. The computer-implemented method as recited in claim 1, comprising generating the estimated analysis and/or processing result without performing analysis and/or processing in response to determining both:

the analysis and/or processing request does not include image data characterized by an image quality which permits accurate analysis and/or processing; and the analysis and/or processing request does include image metadata which permits accurately generating the estimated analysis and/or processing result; and wherein generating the estimated analysis and/or processing result comprises:

determining whether an image corresponding to the image data included in the analysis and/or processing request exists in an image data and/or metadata repository based at least in part on the image metadata;

in response to determining the corresponding image exists in the image data and/or metadata repository;

identifying previously analyzed and/or processed data associated with the corresponding image; and generating the estimated analysis and/or processing result based on the previously analyzed and/or processed data.

6. The computer-implemented method as recited in claim 1, comprising, in response to determining the analysis and/or processing request does not include image data suitable for analysis and/or processing, determining whether an image corresponding to the image data included in the analysis and/or processing request exists in an image data and/or metadata repository, wherein the corresponding image is characterized by an image quality which permits accurately generating the analysis and/or processing result;

in response to determining the corresponding image exists in the image data and/or metadata repository, extracting information from the corresponding image;

analyzing and/or processing some or all of the extracted information using at least one of a plurality of analysis and/or processing models; and for each of the plurality of analysis and/or processing models used to analyze and/or process some or all of the extracted information, storing a corresponding analysis and/or processing result in an analysis and/or processing result repository.

7. The computer-implemented method as recited in claim 1, comprising one or more of establishing and updating:

an image data and/or metadata repository; and an analysis and/or processing result repository; and wherein either or both of the establishing and the updating the image data and/or metadata repository comprises:

receiving one or more images;

receiving and/or generating metadata descriptive of each of the one or more of images, and associating the received and/or generated metadata with the image of which the metadata are descriptive;

classifying at least some of the one or more of images, wherein the classifying of each one of the one or more images is optionally based at least in part on the respective metadata associated with the image;

associating a different image identifier with each classified image; and storing each classified image and the associated image identifier in the image data and/or metadata repository.

8. The computer-implemented method as recited in claim 7, comprising normalizing at least some of the classified images.

9. The computer-implemented method as recited in claim 8, wherein the normalizing comprises generating a composite image from a plurality of images in the image data and/or metadata repository, wherein the composite image either:

includes textual information or a portion of an object depicted in only some of the plurality of images;

excludes distortion present in at least some of the plurality of images; or includes the textual information or the portion of the object depicted in only some of the plurality of images and excludes the distortion present in at least some of the plurality of images.

10. The computer-implemented method as recited in claim 8, wherein the normalizing comprises ranking a plurality of images in the image data and/or metadata repository according to a quality of each of the plurality of images;

designating a top ranked one of the plurality of images for use in generating the analysis and/or processing information for future analysis and/or processing requests corresponding to the top ranked one of the plurality of images with respect to at least one capture characteristic selected from the group consisting of: capture time, capture location, camera position, camera orientation, and camera azimuth; and designating analysis and/or processing information corresponding to the top ranked one of the plurality of images for use in retrieving the analysis and/or processing information for future analysis and/or processing requests corresponding to the top ranked one of the plurality of images with respect to at least one capture characteristic selected from the group consisting of: capture time, capture location, camera position, camera orientation, and camera azimuth; and wherein each of the plurality of images depicts an image characteristic selected from the group consisting of: a same subject, a same location, and a same set of textual information.

11. The computer-implemented method as recited in claim 10, wherein the ranking is based on analyzing metadata associated with each respective one of the plurality of images, the metadata comprising:

one or more indicia of the quality of the respective one of the plurality of images; and capture parameters relevant to analyzing and/or processing the respective one of the plurality of images, or both.

12. The computer-implemented method as recited in claim 11, wherein the metadata are selected from the group consisting of: capture time, capture location, camera position, camera orientation, camera azimuth, environmental conditions at a time of capturing an image, and processing results achieved in response to previously analyzing and/or processing the image.

13. The computer-implemented method as recited in claim 10, comprising generating the analysis and/or processing information using the top ranked one of the plurality of images in response to determining image for which analysis and/or processing is requested is characterized by an image quality which precludes accurately generating an analysis and/or processing result.

14. The computer-implemented method as recited in claim 10, comprising retrieving the analysis and/or processing information corresponding to the top ranked one of the plurality of images in response to determining both of:
the analysis and/or processing request does not include image data from which an accurate analysis and/or processing result can be generated; and
the analysis and/or processing request does not include metadata from which an accurate estimated analysis and/or processing result can be generated.

15. The computer-implemented method as recited in claim 1, comprising one or more of establishing and updating:
an image data and/or metadata repository; and
an analysis and/or processing result repository;
wherein either or both of the establishing and updating, the analysis and/or processing result repository comprises:
receiving one or more images;
extracting information depicted in each of the one or more images;
analyzing and/or processing the information extracted from each respective one of the one or more images according to one or more of a plurality of analysis and/or processing models;
associating a different analysis and/or processing result identifier with each result of analyzing and/or processing the information according to the one or more of the plurality of analysis and/or processing models; and
storing each analysis and/or processing result and the associated analysis and/or processing result identifier in the analysis and/or processing result repository.

16. The computer-implemented method as recited in claim 15, comprising:
associating a different extraction identifier with the information extracted from each respective one of the one or more images; and
storing the information extracted from each respective one of the one or more images in association with the respective different extraction identifier in an extracted information repository.

17. The computer-implemented method as recited in claim 1, wherein the condition data are selected from the group consisting of: a time of day corresponding to capturing the image, environmental conditions corresponding to capturing the image, and network characteristics.

18. The computer-implemented method as recited in claim 1, wherein the metadata are descriptive of image capture conditions selected from the group consisting of: capture device position; capture device orientation; capture azimuth; image resolution; capture flash setting; and image illumination level.

19. The computer-implemented method as recited in claim 1, wherein the image is characterized by an image quality that precludes accurate analysis or processing.

20. The computer-implemented method as recited in claim 1, wherein the analysis and processing request is a request to translate text depicted in the image.

21. A computer program product for proactively improving image analysis and/or processing in real time, said computer program product comprising:
a computer readable storage medium having stored thereon first program instructions executable by a processor to cause the processor to retrieve, without translating any text, a translation of textual information depicted in image data associated with a translation request, the retrieving being performed in response to:
receiving the translation request, wherein the translation request excludes the image data; and either
determining, using the processor, the image data is characterized by an image quality which precludes accurate, direct translation of the textual information; or
determining, using the processor, the translation request includes metadata identifying a second image associated with a previous translation result corresponding to the textual information, the previous translation result being determined from analyzing the second image corresponding to the image data associated with the translation request; and
wherein the metadata comprise a capture device position; a capture device orientation; and a capture azimuth at the time of capturing the image data using the capture device.

* * * * *